US009224060B1

(12) United States Patent
Ramaswamy

(10) Patent No.: US 9,224,060 B1
(45) Date of Patent: Dec. 29, 2015

(54) OBJECT TRACKING USING DEPTH INFORMATION

(71) Applicant: Amazon Technologies, Inc., Reno, NV (US)

(72) Inventor: Sharadh Ramaswamy, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 127 days.

(21) Appl. No.: 14/029,528

(22) Filed: Sep. 17, 2013

(51) Int. Cl.
*G06K 9/00* (2006.01)
*G06K 9/32* (2006.01)

(52) U.S. Cl.
CPC ........................................ *G06K 9/32* (2013.01)

(58) Field of Classification Search
None
See application file for complete search history.

(56) References Cited

U.S. PATENT DOCUMENTS

| | | | | | |
|---|---|---|---|---|---|
| 5,937,079 | A | * | 8/1999 | Franke | G06K 9/209 348/E13.014 |
| 6,771,818 | B1 | * | 8/2004 | Krumm | G06K 9/00369 382/154 |
| 7,366,325 | B2 | * | 4/2008 | Fujimura | G06K 9/00369 382/104 |
| 8,447,098 | B1 | * | 5/2013 | Cohen | G06K 9/00 382/154 |
| 2002/0028014 | A1 | * | 3/2002 | Ono | H04N 13/0296 382/154 |
| 2004/0252862 | A1 | * | 12/2004 | Camus | G06K 9/00201 382/104 |
| 2004/0252863 | A1 | * | 12/2004 | Chang | G06K 9/00805 382/104 |
| 2004/0252864 | A1 | * | 12/2004 | Chang | G06K 9/00624 382/104 |
| 2005/0084179 | A1 | * | 4/2005 | Hanna | H04N 7/181 382/294 |
| 2006/0028552 | A1 | * | 2/2006 | Aggarwal | G01S 3/7864 348/169 |
| 2006/0029272 | A1 | * | 2/2006 | Ogawa | G06K 9/32 382/154 |
| 2006/0193509 | A1 | * | 8/2006 | Criminisi | G06K 9/00241 382/154 |
| 2007/0058838 | A1 | * | 3/2007 | Taniguchi | G06K 9/00664 382/103 |
| 2008/0101652 | A1 | * | 5/2008 | Zhao | G06K 9/00369 382/103 |
| 2010/0128974 | A1 | * | 5/2010 | Koizumi | G06T 7/0075 382/154 |
| 2012/0014506 | A1 | * | 1/2012 | Lee | G03B 35/04 378/41 |
| 2013/0120543 | A1 | * | 5/2013 | Chen | H04N 13/0018 348/51 |

FOREIGN PATENT DOCUMENTS

| | | | | | |
|---|---|---|---|---|---|
| JP | WO 2011086636 | A1 | * | 7/2011 | ......... H04N 13/0022 |
| KR | 20030076906 | A | * | 9/2003 | |
| WO | WO 2011086636 | A1 | * | 7/2011 | |

\* cited by examiner

*Primary Examiner* — Tsung-Yin Tsai
(74) *Attorney, Agent, or Firm* — Novak Druce Connolly Bove + Quigg LLP

(57) ABSTRACT

Systems and approaches are provided for tracking an object of interest using depth or disparity information, such as obtained by calculating stereo disparity between a pair of images. The depth or disparity information can be used as an additional signature for a template of the object of interest for tracking the object. A template that includes depth, distance, or disparity information for an object of interest may be invariant to the effects of lighting, such as shadows and changes in illumination conditions. Depth, distance, or disparity information can also provide information regarding shape and size that can be used to differentiate foreground objects. Depth, distance, or disparity information can also better handle occlusion. Depth, distance, or disparity information can also provide an additional disambiguating dimension for tracking an object.

20 Claims, 8 Drawing Sheets

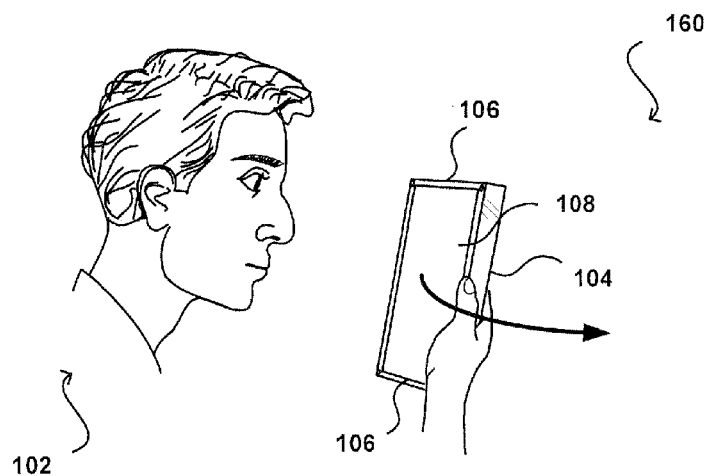
FIG. 1D
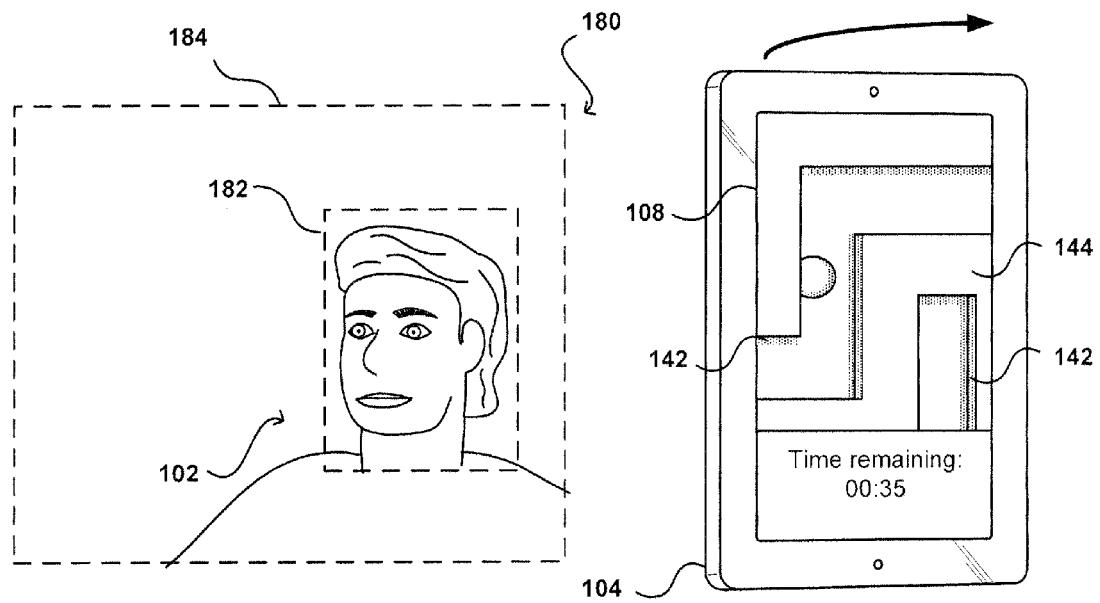
FIG. 1E
FIG. 1F

OBJECT TRACKING USING DEPTH INFORMATION

BACKGROUND

Object tracking has several important applications for users of computing devices, such as personal computers, tablets, and smartphones. For example, object tracking can be implemented for recognizing certain user gestures, such as head nods or shakes or hand and/or finger gestures, as input for the device. Object tracking can also be utilized for advanced device security features such as ensuring "live" facial recognition, fingerprinting, retinal scanning, or identification based on gait. Devices capable of object tracking can also be configured for virtual or augmented reality applications. Object tracking, however, can be challenging because of abrupt motion of the tracked object, changes in appearance of the tracked object and background, non-rigidity of the tracked object, and device motion. In addition, factors such as image sensor and lens characteristics, illumination conditions, noise, and occlusion can also affect how an object is represented from image to image or frame to frame. Further, the requirements of real-time processing can often be at odds with the objective of minimizing processing and power use on portable computing devices.

BRIEF DESCRIPTION OF THE DRAWINGS

Various embodiments in accordance with the present disclosure will be described with reference to the drawings, in which:

FIGS. 1A-1F illustrate an example approach for tracking an object in accordance with an embodiment;

DETAILED DESCRIPTION

Figure 1A:
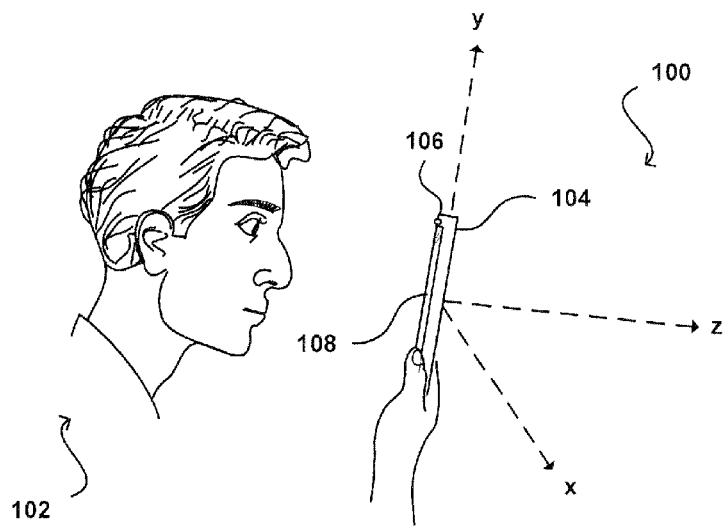

Conventional approaches for object detection and tracking are often processor intensive and quickly drain power of a computing device, which can be a significant problem for portable devices running on battery. Template-based object tracking approaches are often used because of their relative simplicity and low computational cost. However, conventional template-based object tracking approaches can be adversely affected by lighting conditions, such as shadows and changes in illumination, among other such factors. Conventional template-based object tracking techniques can also be more vulnerable to failure due to occlusion of the tracked object. Conventional template-based tracking approaches also may not be capable of handling substantial differences in scale of the tracked object or may require extensively expanding the search space to adequately resolve differences in scale.

Systems and methods in accordance with various embodiments of the present disclosure may overcome one or more of the aforementioned and other deficiencies experienced in conventional approaches for object tracking. In particular, various embodiments can provide for improved template-based object tracking by including depth, distance, or disparity information as part of, or along with, the template of the object of interest. By including depth measurements, for example, template-based object tracking can be less sensitive to factors such as shadows, lighting changes, and camera dynamics. Depth, disparity, or range can also provide information regarding the distance of objects. For objects of known size, this can result in dispensing with the computational expense of searching over scales and reduces the probability of false detections since the search space is decreased. Depth, distance, and disparity also can be used to obtain shape and size information that can help to differentiate among foreground objects for improved object tracking. Further, occlusions can be more easily detected and handled more explicitly. Distance or range also can provide at least a third, disambiguating dimension that can help to improve prediction in tracking. In some embodiments, depth or distance can be determined from a stereo disparity map or image of a pair of images captured at the same time or substantially at the same time.

Various other functions and advantages are described and suggested below in accordance with the various embodiments.

FIGS. 1A-1F illustrate an example approach for tracking an object in accordance with an embodiment. In the example situation 100 of FIG. 1A, a user 102 can be seen viewing a display screen 108 of a computing device 104. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. The computing device can include a pair of cameras 106 located at the an upper region and a lower region (not shown) of the front of the device and on same surface as the display screen to capture image data of subject matter facing the front of the device, such as the user 102 viewing the display screen. It should be understood that, while the components of the example device are shown to be on a "front" of the device, there can be similar or alternative components on the "top," "bottom," "side," or "back" of the device as well (or instead). Further, directions such as "top," "bottom," "side," "back," "upper," and "lower" are used for purposes of explanation and are not intended to require specific orientations unless otherwise stated. The pair of cameras 106 are configured to capture stereoscopic image data such that disparity information can be used to determine, in three dimensions, the relative location of the head of the user to the device. Methods for determining distance using disparity data are well known in the art and, as such, will not be discussed in detail herein. In other embodiments, the pair of cameras can be part of a single camera assembly that can be used to capture stereoscopic images, or other types of three-dimensional data, where offsets in position (or disparity) due to the offset of the cameras can be used to calculate distance, and can be used to render an image that appears to a user to show objects at their respective distances. In some embodiments, a camera assembly might include a single camera or sensor for capturing images that are able to be used to infer three-dimensional position information. For example, a camera assembly might include an infrared (IR) emitter and capture reflected IR such that distance can be inferred by the relative intensity of the reflected IR. In other embodiments, a camera assembly might include a single camera with a proximity sensor or ultrasonic sensor, for example, such that the camera assembly can provide both image and distance data, which can be used to calculate three-dimensional position information. Various other types of camera assemblies can be used as well within the scope of the various embodiments.

In some embodiments, a computing device may also include more than a pair of cameras on the front of the device and/or one or more cameras on the back (and/or sides) of the device capable of capturing image data facing the back surface (and/or top, bottom, or side surface) of the computing device. In this example, each of the cameras 106 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors.

Figure 1B:
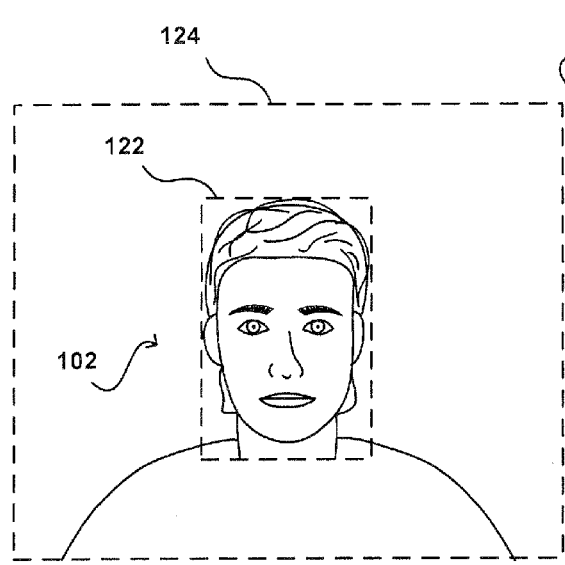
Figure 1C:
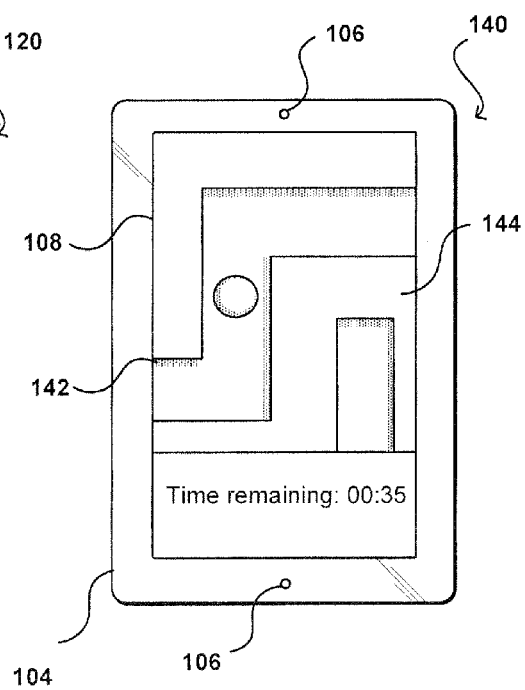

As illustrated in example 120 of FIG. 1B, when the user 102 positions the computing device 104 directly in front of himself and gazes towards the display screen 108, the image data captured by one of the cameras 106 of the device can encompass the image 124. In this example, an object detection process locates the head or face of the user 102 within the image 124 and provides as output the dimensions of a bounded box 122 indicating where the head or the face of the user is located in the image. In various embodiments, software (e.g., user application, software library, operating system) executing on the computing device 104 attempts to determine the position, orientation, and/or movement of objects, such as the head or face of the user 102, in three-dimensional space. Such a determination can be performed using various types of configurations. For example, two-dimensional image information can be captured to determine certain direction and motion information using a conventional camera and the computing device can utilize structured lighting to obtain three-dimensional information by projecting a regular pattern of light (e.g., infrared (IR) light) and analyzing the changes in the reflected pattern due to three dimensional objects. In other embodiments, other approaches such as those used for motion capture can be implemented for monitoring the change in location of specific features during user movement. For example, in some embodiments, two-dimensional image capture can be enhanced using a distance sensor, range finders, ultrasonic transceiver, or other such device capable of providing distance information. In some embodiments, three-dimensional or stereoscopic image information can be captured using multiple cameras to provide three-dimensional point data, or disparity information that can be used to determine motion in three dimensions. Various other approaches can be utilized as well as should be apparent to one of ordinary skill in the art in light of the teachings and suggestions contained herein. FIG. 1C illustrates an example 140 of content rendered on a display screen 108 of the device 104, where the content includes information for a maze. Example 140 is a top down view of the maze, and shadowing 142 is rendered for the walls 144 of the maze to simulate three-dimensional graphical elements on the two-dimensional display screen 108. This particular perspective of the maze is rendered according to the current position and orientation of the user 102 with respect to the computing device 104.

In FIG. 1D, an example situation 160 illustrates that the user 102 has tilted the computing device 104 to the right with respect to the perspective of the user, i.e., the user has rotated the device along the longitudinal or y-axis (where the lateral axis corresponds to the x-axis and the depth of the device or vertical axis corresponds to the z-axis) to obtain a second view or perspective of the 3-D maze. As seen in FIG. 1E, the tilt or rotation of the device causes one of the cameras 106 to capture a different view or perspective of the user within image 184, here, a three quarter profile of the head or face of the user facing leftward. The position of the user's face has also shifted from the center of the image to a right region of the image because of the tilt or rotation of the device. In this example, the apparent motion of the face or head of the user (which is actually due to the motion of the device) is tracked from the initial position detected in FIG. 1B to the new position depicted in FIG. 1E. FIG. 1F illustrates how the content displayed on a display screen may be modified based on a rightward rotation of the device. As discussed above, the walls 144 of the maze can be re-rendered to show shadowing 142 consistent with the change in viewing direction if the maze were actually rendered in three dimensions. Further, the device can generate shadows for the "three-dimensional" elements based at least in part upon the change in position and orientation of the user, as would be consistent for the current user viewing angle. The ability to adjust shadowing with the changes in display in a realistic way can help to enhance the user experience, and can also help the user to better understand the direction and/or texture of, for example, a two-dimensional representation of a three-dimensional element. Various other shading approaches can be used as well as should be apparent in light of the teachings and suggestions contained herein. When the user tilts the device forward, i.e., rotating the device along the x-axis such that the top portion of front of the device is further away from the user and the bottom portion of the front of the device is closer to the user, details of the southern faces of the maze walls may be displayed. Likewise, tiling the device backwards can cause details of the northern faces to be rendered for display and rotating the device leftward may reveal additional details of the eastern faces of the maze walls. It will be appreciated that objects, such as the face or head of the user, can generally be tracked according to six degrees of freedom (e.g., motion along the x-, y-, and z-axes or forward/backward, up/down, and left/right, and rotation along the x-, y-, and z-axes or pitch, yaw, and roll) and the device can be configured to appropriately respond to such various motions. For example, when the user tilts the device such that the top left corner of the device is closest to the user, the maze application of FIGS. 1A-1F may cause details of the northern and eastern faces of the maze walls to be displayed and when the user positions the device such that the bottom right corner of the device is closest to the user, details of the southern and western faces of the maze walls can be rendered for display.

For any pair of these cameras that have at least a partially overlapping field of view, three-dimensional imaging can be performed by capturing image information for one or more objects from two different perspectives or points of view, and combining the information to produce a 3D image. Methods for producing a 3D image using image information from different perspectives are well known in the art and will not be described in detail herein. Example approaches include calculating an amount of disparity through a process such as edge matching, feature location and matching, color matching, and/or texture matching, and combining the disparity information with color information from each perspective to generate a three-dimensional image, either before or at a time of display. For example, if the image information is matched then the image information can be combined and/or displayed directly on a 3D-capable display, wherein the human brain can effectively do at least some of the 3D processing. In other examples, the image information can be otherwise combined or processed at the time of display such that upon displaying the information a 3D image is generated. It should be understood, however, that 3D image data can be used for other purposes or for further processing, such that using the image data to generate and display a 3D image is not required. For example, the data can be used to determine shape and/or relative position information for various computer vision techniques, such as for determining one or more viewpoint and scale invariant feature descriptors used for object recognition and/or tracking.

In various embodiments, an objection detection process is used to detect an object and determine a location of the object in image data, such as one or more images captured simultaneously or substantially at the same time using one or more cameras. Approaches for detecting an object can include feature detection, background subtraction, segmentation, or supervised learning. Feature-based approaches generally involve extracting features from an image (or video frame) and applying various rules, metrics, or heuristics to determine whether the specified object is present in the image data. Extracted features can be low-level image features, such as points (e.g., line intersections, high variance points, local curvature discontinuities of Gabor wavelets, inflection points of curves, local extrema of wavelet transforms, Harris corners, Shi Tomasi points), edges (e.g., Canny edges, Shen-Castan (ISEF) edges), or regions of interest (e.g., blobs, Laplacian of Gaussian blobs, Difference of Gaussian blobs, Hessian blobs, maximally stable extremum regions (MSERs)). An example of a low-level image feature-based approach for user detection is the facial detection method of Sirohey. In the Sirohey method, an edge map (generated via, e.g., a Canny detector, Sobel filter, Marr-Hildreth edge operator) and heuristics are used to remove and group edges from an input image so that only the edges of the contour of a face remain. A box or ellipse is then fit to the boundary between the head region and the background. Low-level feature-based methods can also be based on gray level information or skin color. For example, facial features such as eyebrows, pupils, and lips generally appear darker than surrounding regions of the face and this observation can be used to detect a face within an image. In one such approach, the facial detection method of Chetverikov and Lerch, a low resolution Gaussian or Laplacian of an input image is utilized to locate linear sequences of similarly oriented blobs and streaks, such as two dark blobs and three light blobs to represent eyes, cheekbones, and nose and streaks to represent the outline of the face, eyebrows, and lips. Geometric rules can be applied to analyze the spatial relationships among the blobs and streaks to verify whether a person is located in the image. Skin color can also be used as a basis for detecting and/or tracking a user because skin color comprises a limited range of the color spectrum that can be relatively efficient to locate in an image.

Extracted features can also be based on higher-level characteristics or features of an object, such as the eyes, nose, and/or mouth of a person or the windshield, doors, and tires of a vehicle, One example of higher-level feature detection approach is Yang and Huang facial detection which first attempts to detect a particular user feature (e.g., head or face) and then validates existence of a person in an image by detecting constituent components of that user feature (e.g., eyes, nose, mouth). In this embodiment, a person is detected as present within an image by generating from the image a set of pyramidal or hierarchical images that are convolved and subsampled at each ascending level of the image pyramid or hierarchy (e.g., Gaussian pyramid, Difference of Gaussian pyramid, Laplacian pyramid). At the highest level, comprising the lowest resolution image of the image pyramid or hierarchy, the most general set of rules can be applied to find whether a user is represented. An example set of rules for detecting a face may include the upper round part of a face comprising a set of pixels of uniform intensity, the center part of a face comprising a set of pixels of a second uniform intensity, and the difference between the intensities of the upper round part and the center part of the face being within a threshold intensity difference. The image pyramid or hierarchy is descended and face candidates detected at a higher level conforming to the rules for that level can be processed at finer resolutions at a lower level according to a more specific set of rules. An example set of rules at a lower level or higher resolution image of the pyramid or hierarchy can be based on local histogram equalization and edge detection, and rules for the lowest level or highest resolution image of the pyramid or hierarchy can be based on facial feature metrics. In another approach, the facial detection method of Kotropolous and Pitas, face candidates are located based on the Kanade projection method for locating the boundary of a face. In the projection method, an intensity profile of an input image is first analyzed along the horizontal axis, and two local minima are determined to be candidates for the left and right side of a head. The intensity profile along the vertical axis is then evaluated and local minima are determined to be candidates for the locations of the mouth, nose, and eyes. Detection rules for eyebrow/eyes, nostrils/nose, and mouth or similar approaches can be used to validate whether the candidate is indeed a face.

Background subtraction involves developing a model of the background of the scene in a first image (or video frame) and then determining outlier pixels from the background model in a second image (or video frame). Significant deviations from the background model indicate a moving object. One background subtraction method is the Wren algorithm which models the color of each pixel, I(x, y) in an image, of a stationary background as a single 3D (e.g., luma/chrominance system, such as YUV or YCbCr) Gaussian distribution:

$$I(x,y) \sim L(\mu(x,y), \Sigma(x,y)),$$

where $\mu(x,y)$ is the mean, $\Sigma(x,y)$ is the covariance, and L is the likelihood of a color coming from the background model. The brightness (or luminance) and color (or chrominance) is observed over several consecutive frames to determine the mean and covariance of the Gaussian distribution, and the likelihood is calculated. Pixels deviating from the background model are further identified as a moving object. In another embodiment, the method of Stauffer and Grimson can be used, which models the background of an image scene as a mixture of Gaussians. In Stauffer and Grimson, a pixel in a current frame is checked against the background model by comparing it with every Gaussian in the model until a matching Gaussian is found. If a match is found, the mean and variance of the matched Gaussian is updated, otherwise a new Gaussian with the mean equal to the current pixel color and some initial variance is introduced into the mixture of Gaussians. The means of the highest weighted Gaussians at each pixel represent the most temporally persistent pixel and are identified as background pixels, and the means of the Gaussians with the second highest weight represent pixels that are observed less frequently, and are identified as moving objects. In another embodiment, the approach of Elgammal and Davis can be used to incorporate region-based scene information. In Elgammal and Davis, kernel density estimation is used to model each pixel of the background. During the subtraction process, pixels are matched to corresponding background pixels as well as nearby pixels to filter out camera jitter or small movements in the background. Li and Leung combine texture and color features to perform background subtraction over small blocks of the image. As texture does not substantially vary with respect to changes in illumination, Li and Leung's approach may be less sensitive to illumination changes. Other background subtraction techniques include modeling background pixels as discrete states in the environment (e.g., background, foreground, shadow) and using hidden Markov models (HMM) to identify small blocks of an image that correspond to each state, modeling the background using eigenspace decomposition with the background corresponding to the most descriptive eignvectors and the foreground corresponding to the difference between the projection of the current image (or video frame) to the eigenspace, or modeling the background using autoregressive moving average (ARMA) processes to filter repetitive motion (e.g., grass blowing in the wind or swaying trees).

Segmentation-based approaches partition an image (or video frame) into similar regions, and include mean-shift clustering, graph cuts, and active contours. The mean-shift approach finds clusters in the spatial and color space [l, u, v, x, y] where l is the brightness, u and v are the chrominance, and x and y are the location. A large number of hypothesized cluster centers are randomly chosen, and each cluster center is moved to the mean lying inside a multidimensional ellipsoid centered on the cluster center, with some of clusters merging during this mean-shift process. The vector corresponding to the old and new cluster centers are called the mean-shift vectors, and the mean-shift vectors are calculated iteratively until the cluster centers do not change position. In graph cut methods, image segmentation is approached as a graph partitioning problem with pixels representing nodes of a graph that are partitioned into disjoint subgraphs by pruning the weighted edges of the graph. The total weight of the pruned edges between two subgraphs is called a cut, and the weights may be based on similarities in color, brightness, and/or texture. In one embodiment, a minimum cut criterion can be used to find partitions that minimize a cut. In another embodiment, a normalized cut can be used that depends on edge weights as well as the ratio of the total connection weights of nodes in each partition to all nodes of the graph. In active contours approaches, an object is segmented by transforming a closed contour of the object's boundary such that the contour tightly encloses the object region according to an energy function, such as:

$$E(C) = \int_0^1 E_{int}(v) + E_{im}(v) + E_{ext}(v) ds,$$

where s is the arc-length of the contour C, $E_{int}$ specifies the regularization constraints, $E_{im}$ is the image-based energy, and $E_{ext}$ specifies additional constraint. $E_{int}$ typically includes a curvature term, first-order ($\nabla v$), or second-order ($\nabla^2 v$) continuity terms to find the shortest contour. The image-based energy, $E_{im}$, can be computed locally or globally. Local information is often determined from an image gradient evaluated around the contour while global features are computed inside and outside the object. Global features can include color and texture.

Supervised learning approaches involve learning different views or perspective of an object from a set of examples within an object class. Supervised learning methods include principal component analysis (PCA), neural networks, support vector machines (SVM), inductive learning, and adaptive boosting (Adaboost), among others. Eigenfaces are an example of an approach based on PCA. PCA is performed on a training set of images known to include faces to determine the eigenvectors of the covariance matrix of the training set. The Eigenfaces span a subspace called the "face space." Images of faces are projected onto the subspace and clustered. To detect a face of a person in an image, the distance between a region of the image and the "face space" is computed for all location in the image. The distance from the "face space" is used as a measure of whether image subject matter comprises a face and the distances from "face space" form a "face map." A face can be detected from the local minima of the "face map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include Rowley's multilayer neural network, the autoassociative neural network, the probabilistic decision-based neural network (PDBNN), and the sparse network of winnows (SNoW). Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of face patterns at multiple resolutions. At each scale, a face image is decomposed into subregions and the subregions are further decomposed according to space, frequency, and orientation. The statistics of each projected subregion are estimated from the projected samples to learn the joint distribution of object and position. A face is determined to be within an image if the likelihood ratio is greater than the ratio of prior probabilities, i.e., $$\frac{P(\text{image} | \text{object})}{P(\text{image} | \text{non-object})} > \frac{P(\text{non-object})}{P(\text{object})}.$$

Inductive learning approaches, such as those based on Quinlan's C4.5 algorithm or Mitchell's Find-S algorithm, can also be used to detect the presence of persons in images.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector. Viola-Jones scans a sub-window of an input image using features consisting of Haar-like features, black and white boxlets that are weighted during training, and resized over several passes of the detector. A sub-window is determined to be a face candidate if the difference of the sum of pixels within two regions meets a threshold θ for a Haar-like feature determined during the training stage:

$$h_j(x) = \begin{cases} 1 & \text{if } p_j f_j(x) < p_j \theta_j \\ 0 & \text{otherwise} \end{cases},$$

where $h_j x(x)$ is a weak classifier consisting of feature $f_j$ and $p_j$ indicates the direction of the inequality sign. In Viola-Jones, x is defined as a 24×24 pixel sub-window of the input image.

These computations can be quickly and efficiently determined based on an "integral image" derived from the input image, and defined as:

$$ii(x,y) = \Sigma_{x' \leq x, y' \leq y} i(x',y'),$$

where ii(x,y) is the pixel value at location (x,y) of the integral image and i(x,y) is the pixel value at location (x,y) of the input image. That is, the pixel value at (x,y) of the integral image is determined by summing the pixel values above and to the left of x,y, inclusive, in the input image. The integral image can be used to determine the sum of any rectangle ABCD in the input image at constant time by reference to the integral image:

$$\Sigma_{(x,y) \in ABCD} i(x,y) = ii(D) + ii(A) - ii(B) - ii(C),$$

where A is the top-left corner of the rectangle, B the top-right corner, C the bottom-left corner, and D the bottom-right corner. Viola-Jones further utilizes the concept of attentional cascading which observes that within an image, most sub-windows are non-face instances. Thus, smaller and more efficient classifiers can be used to reject sub-windows unlikely to be faces at earlier stages of the detector while keeping almost all of the positive instances. More complex classifiers are used at later stages to examine face candidates that have not been rejected as face candidates.

Surveys of various approaches of object detection are discussed in Yang, Ming-Hsuan et al., "Detecting faces in images: A survey." *Pattern Analysis and Machine Intelligence, IEEE Transactions* on 24, no. 1 (2002): 34-58 and Hjelmås, Erik et al. "Face detection: A Survey." *Computer Vision and Image Understanding* 83, no. 3 (2001): 236-274, which are each incorporated herein by reference.

Approaches in accordance with various embodiments track an object from an initial known position in a first set of one or more images captured at a first time (simultaneously or substantially at the same time) to a second position in a second set of one or more images captured at a second time (simultaneously or substantially at the same time) using template matching. In template matching, a pattern of an object of interest or a parameterization of the object is used to locate the object in an image. Templates can be rigid (i.e., fixed) or deformable. Within the class of rigid templates, correlation calculation methods or the Hough transform can be used to detect and track the template of the object of interest in an image. In the Hough method, points in the spatial feature space are transformed into parameter space, and a specified shape is detected by finding the peak(s) in the parameter space.

Correlation calculation methods involve searching an image I for a region similar to a template T by computing a similarity measure that maximizes a criterion, such as the normalized cross correlation (NCC) or the correlation coefficient (CC), or minimizes a criterion, such as the sum of squared differences (SSD) or the sum of absolute differences (SAD). For example, if (x,y) represents a pixel in I and (x',y') represents a pixel in T, then these functions can be defined as follows:

$$SSD(x,y) = \Sigma_{x',y'} [T(x',y') - I(x+x',y+y')]^2$$

$$SAD(x,y) = \Sigma_{x',y'} |T(x',y') - I(x+x',y+y')|$$

$$NCC(x,y) = \Sigma_{x',y'} T(x',y') I(x+x',y+y')$$

$$CC(x,y) = \frac{\sum_{x',y'} T'(x',y') I(x+x',y+y')}{\sqrt{\sum_{x',y'} T'(x',y')^2 \sum_{x',y'} I(x+x',y+y')^2}},$$

where T'(x',y') is the average value of T, as defined by:

$$T'(x',y') = T(x',y') - \frac{1}{wh} \sum_{x',y'} T(x',y')$$

and I'(x+x',y+y') is the average value of I in the region coincident with T, as defined by:

$$I'(x+x',y+y') = I(x+x',y+y') - \frac{1}{wh} \sum_{x',y'} T(x',y'),$$

where x'=0 . . . w−1 and y'=0 . . . h−1 for SSD, SAD, NCC, and CC. In various embodiments, the SSD, SAD, NCC, and CC methods can be extended to three dimensions (e.g., x, y, and d) where d is the depth or disparity at each pixel (x,y).

Deformable templates are able to deform or adapt themselves to fit the data by transformations that are possibly more complex than translation, rotation, and scaling (as in the case of rigid templates). Deformable templates can be characterized as free-form or parametric. Free-form deformable models can take any arbitrary shape as long as a regularization constraint (e.g., continuity, smoothness) is satisfied. Such templates can be deformed to match salient features such as lines and edges using energy functions produced by those features. Free-form modeling approaches include active contours (i.e., snakes), such as the Yuille method, which matches a parameterized face template to face candidate regions of an input image. Two additional templates are used for matching the eyes and mouth respectively. An energy function is defined that links edges, peaks, and valleys in the image intensity profile to the corresponding characteristics in the templates, and the energy function is minimized by iteratively adjusting the parameters of the template to the fit to the image.

Parametric deformable models include information related to the shape of the object of interest and a set of deformation modes which allows the initial shape to vary and adapt to real images. Parametric deformable template approaches include the active shape model (ASM). ASMs statistically model the shape of the deformable object and are built offline with a training set of images having labeled landmarks. The shape of the deformable object can be represented by a vector of the labeled landmarks. The shape vector can be normalized and projected onto a low dimensional subspace using principal component analysis (PCA), The ASM is used as a template to determine whether a person is located in an image. The ASM has led to the use of Active Appearance Models (AAMs), which further include defining a texture or intensity vector as part of the template. Based on a point distribution model, images in the training set of images can be transformed to the mean shape to produce shape-free patches. The intensities from these patches can be sampled to generate the intensity vector, and the dimensionality of the intensity vector may be reduced using PCA. The parameters of the AAM can be optimized and the AAM can be fit to an object appearing in the new image using, for example, a gradient descent technique or linear regression.

Figure 2A:
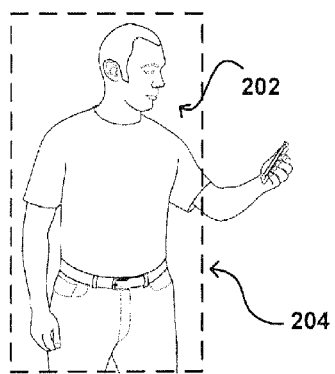
FIGS. 2A-2C illustrate example representations of templates that can be used for tracking an object of interest that can be used in accordance with various embodiments.
Figure 2B:
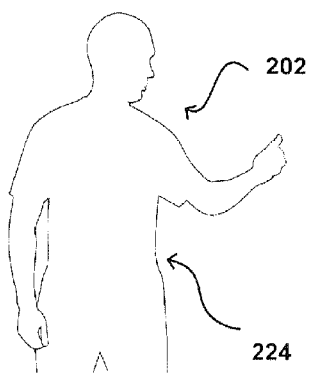
Figure 2C:
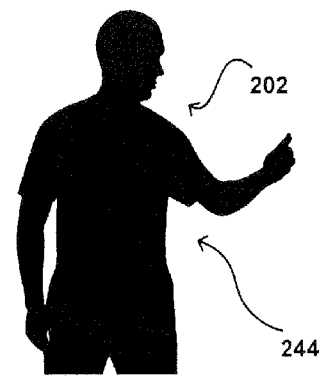

FIGS. 2A-2C illustrate example representations of templates that can be used to track an object of interest in accordance with various embodiments. FIG. 2A illustrates an example template 204 for tracking an object of interest, a user 202, comprising a rectangle bounding the object of interest. The template 204 representing the user 202 can include pixels inside the rectangle and an associated histogram. Templates can also include textures, image intensity, color features, or image gradients of the object of the interest. In some embodiments, a template can also include color histograms of the object of interest, mixture models of the pixels of a primitive geometric bounding the object of interest (e.g., rectangle, ellipse, circle, etc.), or surface radiance of the object of interest. In other embodiments using a similar approach, other primitive geometric shapes can be used, such as circles or ellipses.

Objects of interest can have complex shapes that cannot be accurately represented as primitive geometric shapes. For example, the hands or head of a user cannot be circumscribed precisely by simple geometric shapes. Thus, in at least some embodiments, a silhouette or a contour can be used as a template for tracking an object of interest in image data. FIG. 2B illustrates a template comprising the contours 224 of an object of interest, user 202, defined by the boundaries of the representation of the user. Other contour representations of an object of interest may comprise of points at the boundaries of the object instead of edges. The region inside the contours of an object is sometimes referred to as the "silhouette," which can also be used as a template for an object of interest in some embodiments. FIG. 2C illustrates an example template 244 comprising a silhouette of an object of interest, user 202.

Various approaches can be used to track an object of interest from a template of the object, including simple template matching, multiview appearance modeling, contour-based tracking, or silhouette-based tracking. In simple template matching, a brute force approach can be used to search an image or frame for a region similar to the template of the object defined in a previous image or frame. As mentioned, the position of the template in the an image or frame is determined by a similarity measure, such as a maximum of the cross-correlation, normalized cross-correlation, or cross coefficient or a minimum of a criterion, such as the sum of squared differences, sum of absolute differences. In some embodiments, other tracking approaches can be used instead of a brute force search, such as mean-shift tracking or the approach of Jepson. In Jepson tracking, the object is represented as a three component mixture comprising stable appearance features of the object, transient features of the object, and noise. An online version of the expectation maximization (EM) algorithm is used to determine the parameters of the mixture. Multiview appearance modeling includes PCA and SVM, which are discussed elsewhere herein.

In contour-based tracking approaches, an initial contour of the object is evolved to its new position in a current image or frame. Tracking an object by evolving a contour of the object can be performed using a state model of the contour shape and motion or minimizing the contour energy using direct minimization techniques. In the contour shape and motion modeling approach, the state of the model is updated at each time instant such that the contour's a posteriori probability is maximized. The posterior probability depends on the prior state and the current likelihood which is typically defined in terms of the distance of the contour from observed edges. Kalman filtering or particle filtering can be used to predict new states of the object contour and update the states of the object contour. In energy-based contour tracking, the energy of the contour can be minimized using greedy methods or by gradient descent. The contour energy can be defined in terms of temporal information in the form of optical flow fields or appearance statistics generated from the object and the background regions.

In silhouette-based tracking methods, the object silhouette is searched for image to image or frame to frame. Such approaches are similar to approaches for template matching in that the search for an object silhouette and its associated model in a current image or frame is performed by determining the similarity of the object with the model generated from the hypothesized object silhouette based on a previous image or frame. Silhouette tracking approaches can also be determined based on identifying the flow fields for each pixel inside the object silhouette that is dominant over the entire object silhouette.

Figure 3A:
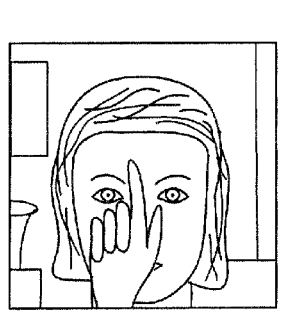
FIGS. 3A-3D illustrate examples of images that can be used and/or generated using stereoscopic cameras to obtain disparity information that can be leveraged in accordance with various embodiments.
Figure 3B:
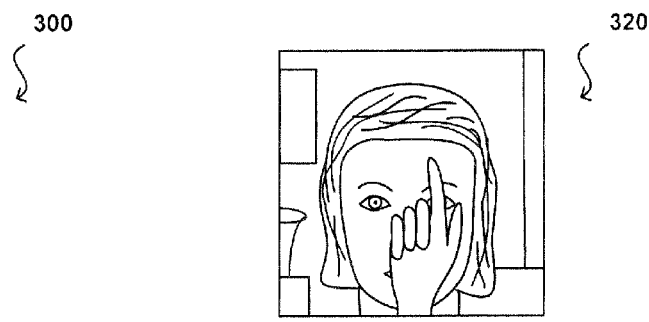

Systems and methods in accordance with various embodiments enhance template-based object tracking by further defining a template of an object of interest by its depth or distance map using approaches such as structured lighting or stereo disparity or obtaining depth, distance, or range data from a proximity sensor, distance sensor, depth sensor, range finder, ultrasonic receiver, and the like. FIGS. 3A-3D illustrate an approach for determining a stereo disparity image from stereoscopic image data. FIG. 3A illustrates what will be referred to herein as a "left" image 300 and FIG. 3B illustrates what will be referred to herein as a "right" image 320, although other orientations can be used as well in other situations and embodiments. These images are each captured by one of a pair of cameras that are offset from each other along a horizontal axis, such that one camera is offset to the left and one is offset to the right in this orientation. As discussed elsewhere herein, pairs of cameras can be offset in up and down directions, among other such options. Since each image is captured using a camera at a slightly different location, the position of objects in each image will be different. In order for the images to combine to form an accurate three-dimensional image, the cameras used to capture the component images should be sufficiently aligned and/or rectified to represent the correct amount of disparity. When the cameras are aligned, correlating or matching feature points between images captured with a stereoscopic camera pair can be determined based at least in part on an epipolar line between the respective images and determined coordinates for at least one of the feature points.

Figure 3C:
Figure 3D:
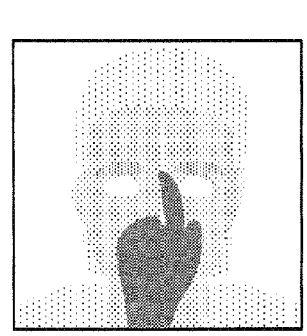

In various embodiments, the pair of front-facing cameras may capture the images simultaneously or substantially simultaneously and therefore would include matching points of interest in their respective images. For example, the user's finger, nose, eyes, eyebrows, lips or other feature points may be identified by the computing device in both images by using any one of the detection or tracking processes mentioned above. FIG. 3C illustrates an example combination image 340, and FIG. 3D illustrates a stereo disparity image 360 of the combination image 340 showing the relative position of various objects in the captured images 300 and 320. As illustrated, objects closest to the camera (as indicated by darker shading), such as the user's hand, have the greatest amount of disparity, or horizontal offset between images. Objects farther away from the device, such as a painting on the wall, have very small amounts of disparity. Objects between these two areas will have intermediate amounts of disparity based upon the relative distance of those objects from the cameras.

Various approaches can be used to determine a stereo disparity image, such as the example disparity image 360 of FIG. 3D, or a stereo disparity map that associates each pixel (x,y) with a disparity value d, i.e., defining a function of (x, y, d). In general, stereo disparity can include several of the following steps: matching cost computation, cost aggregation, disparity computation or optimization, and disparity refinement. Matching cost computations are similar to the correlation tracking approaches discussed elsewhere herein, and involve analyzing respective regions of a pair of stereo images to determine a similarity measure such as SSD, SAD, NCC, CC, or binary matching costs based on binary features such as edges or the sign of the Laplacian. Matching cost computations can also be calculated using truncated quadratics, contaminated Gaussians, phase responses, filter-bank responses, among others. In some embodiments, calculating stereo disparity between a pair of images can include cost aggregation, Cost aggregation relates to distributing the cost computation over a support region, such as by summing or averaging over a respective window or region of a pair of stereo images. A support region can be either two-dimensional at a fixed disparity or three-dimensional in x-y-d space. Two-dimensional cost aggregation techniques can be based on square windows, Gaussian convolutions, multiple shiftable windows, windows with adaptive sizes, and windows based on connected components of constant disparity. Three-dimensional cost aggregation techniques can be based on disparity differences, limited disparity gradients, and Prazdny's coherence principle. Another cost aggregation technique that can be used in an embodiment is iterative diffusion, which operates by adding to each pixel's cost the weighted values of its neighboring pixels' costs.

In some embodiments, determining a stereo disparity image or mapping for a pair of images can include computing disparity and optimization. Approaches for disparity computation and optimization can include local methods or global methods. Local methods involve selecting the disparity associated with the minimum (or maximum) cost value at each pixel and can be characterized as a "winner-take-all" approach. Global methods can be based on an energy-minimization function, wherein disparity at each pixel is based on minimizing a global energy and can depend on smoothness assumptions made by a particular global algorithm. Once a global energy has been determined, a variety of algorithms can be used to find the disparity at each pixel, including techniques based on Markov random fields, simulated annealing, highest confidence first approaches, and mean-field annealing. Global optimization techniques can also be based on max-flow, graph-cuts, dynamic programming methods, and cooperative algorithms.

In some embodiments, refinement techniques can also be used for improving stereo disparity image or mapping results by determining sub-pixel disparity. One such method is applying iterative gradient descent and fitting a curve to the matching cost computations at discrete disparity levels. Other refinement approaches can include cross-checking (e.g., comparing left-to-right and right-to-left disparity maps), median filtering to compensate for incorrect matching, and distributing neighboring disparity estimates to fill in "holes" caused by occlusion.

As discussed, determining a stereo disparity image or mapping can involve one or more of matching cost computation, cost aggregation, disparity computation or optimization, and disparity refinement. For example, in an embodiment, calculating a stereo disparity mapping can include determining the matching cost according to a squared difference of intensity values at a particular disparity, aggregating by summing matching costs over square windows with constant disparity, and computing disparities by selecting the minimal aggregated value at each pixel. In another embodiment, the stereo disparity image or mapping can be determined by combining matching cost computation and cost aggregation (e.g., NCC or rank transform).

In other embodiments, the stereo disparity image or mapping can be determined by setting explicit smoothness assumptions and then solving an optimization problem. Such an approach may not require cost aggregation but instead searches for a disparity for each pixel that minimizes a global cost function that combines matching cost computations and smoothness terms. Minimization can be based on simulated annealing, mean-field diffusion, or graph cuts, among others. In still other embodiments, determining the stereo disparity image or mapping can be based on iterative algorithms (e.g., hierarchical algorithms). Various other combinations can be implemented for determining a stereo disparity image or mapping to those of ordinary skill in light of the teachings and disclosure herein.

Figure 4:
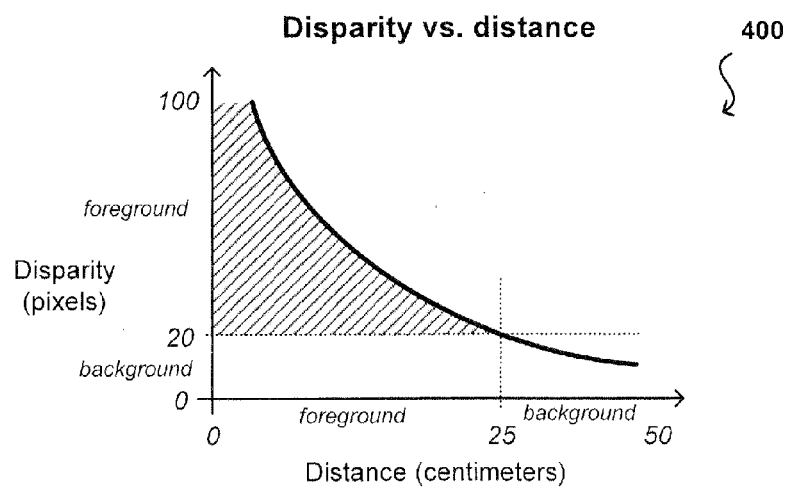
FIG. 4 illustrates an example plot showing a relationship of disparity with respect to distance in accordance with an embodiment.

FIG. 4 illustrates an example plot 400 showing a relationship of disparity with respect to distance. As illustrated, the amount of disparity is inversely proportional to the distance from the cameras, such that there can be significantly more disparity in the near camera field (e.g., 0 to 1.0 m) than in the far field (e.g., 1.0 m to infinity). Further, the decrease is not linear but decreases more quickly near the device than at a distance, as objects in the distance can have little to no disparity regardless of whether they are twenty feet away or a mile away. An approach in accordance with various embodiments can determine the distance between an object or feature and the device based on the amount of stereo disparity for the object between two images captured by the pair of cameras. For example, a user's face looking at a smart phone might typically be located within 50 centimeters from the device. By examining the disparity relationship curve 400 or relationship, the computing device (or an application or user of the device) can determine that the amount of disparity at fifty centimeters for the configuration parameters of the current device (e.g., camera resolution, camera separation, field of view, etc.) is twenty five pixels of separation between images. Using this information, the device can analyze matching feature points (e.g., nose, eyes, fingertips, etc.) in the stereo images, and determine the approximate distance between those feature points and the computing device. For example, the amount of disparity, D, at a given distance, d, can be represented by the relationship:

$$D = f \times B / d$$

where f is the focal length of each of the matched cameras and B is the baseline, or distance between the viewpoints of the cameras based at least in part upon their relative positions and separation. In this example, if the focal length of a camera is four hundred pixels and the baseline is five centimeters, for a distance of one meter the disparity would be twenty pixels. Based on relationships such as this one, the computing device may be able to determine the distance between the object of interest and the device.

Figure 5A:
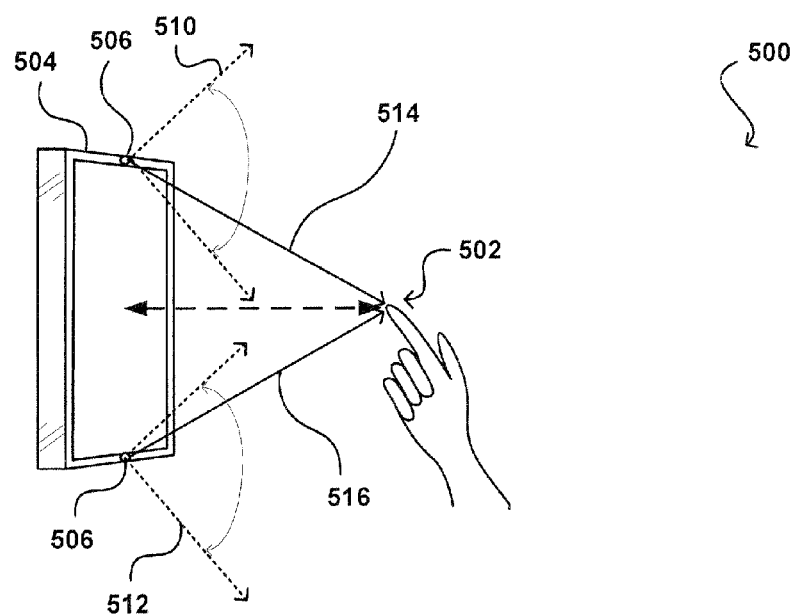
FIGS. 5A-5C illustrate an example approach for tracking an object that an be used in accordance with various embodiments.
Figure 5B:
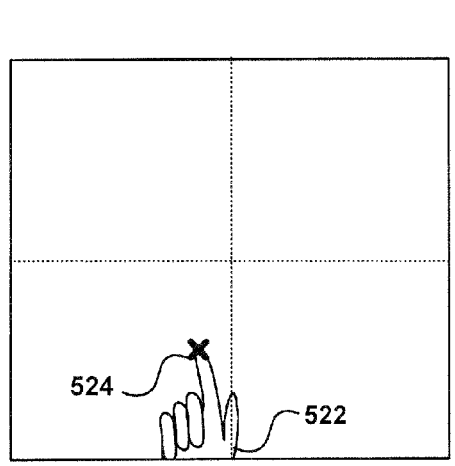
Figure 5C:
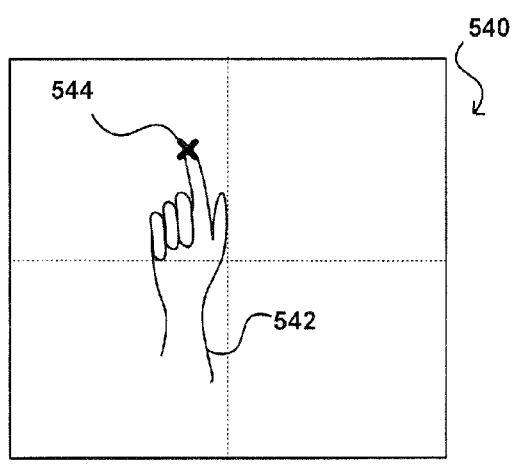

In various embodiments, templates may also be used to determine the location of one or more features of an object, such as the user's finger with respect to a display or other such element of a computing device. FIG. 5A-5C illustrate an example approach for tracking a feature of an object that can be utilized in accordance with various embodiments. In this example, input can be provided to a computing device 504 by monitoring the position of the user's fingertip 502 with respect to the device, although various other features can be used as well as discussed and suggested elsewhere herein. In some embodiments, a pair of cameras can be used to capture image information including the user's fingertip, where the relative location can be determined in two dimensions from the position of the fingertip in the image and the distance determined by the relative size of the fingertip in the image. The distance between the finger and the camera may be computed based on the stereo disparity information, as previously described. The illustrated computing device 504 in this example instead includes at least two different cameras 506 positioned on the device with a sufficient separation such that the device can utilize stereoscopic imaging (or another such approach) to determine a relative position of one or more features with respect to the device in three dimensions. In this example, the upper camera is able to see the fingertip 504 of the user as long as that feature is within a field of view 510 of the upper camera and there are no obstructions between the upper camera and those features. If software executing on the computing device (or otherwise in communication with the computing device) is able to determine information such as the angular field of view of the camera, the zoom level at which the information is currently being captured, and any other such relevant information, the software can determine an approximate direction 514 of the fingertip with respect to the upper camera. In some embodiments, methods such as ultrasonic detection, feature size analysis, luminance analysis through active illumination, or other such distance measurement approaches can be used to assist with position determination as well.

In this example, a second camera is used to assist with location determination as well as to enable distance determinations through stereoscopic imaging. The lower camera in FIG. 5A is also able to image the fingertip 502 as long as the feature is at least partially within the field of view 512 of the lower camera. Using a similar process to that described above, appropriate software can analyze the image information captured by the lower camera to determine an approximate direction 516 to the user's fingertip. The direction can be determined, in at least some embodiments, by looking at a distance from a center (or other) point of the image and comparing that to the angular measure of the field of view of the camera. For example, a feature in the middle of a captured image is likely directly in front of the respective capture element. If the feature is at the very edge of the image, then the feature is likely at a forty-five degree angle from a vector orthogonal to the image plane of the capture element. Positions between the edge and the center correspond to intermediate angles as would be apparent to one of ordinary skill in the art, and as known in the art for stereoscopic imaging. Once the direction vectors from at least two image capture elements are determined for a given feature, the intersection point of those vectors can be determined, which corresponds to the approximate relative position in three dimensions of the respective feature.

Further illustrating such an example approach, FIGS. 5B and 5C illustrate example images 520 and 540, respectively, that could be captured of the fingertip using the cameras 506 of FIG. 5A. In this example, FIG. 5B illustrates an example image 520 that could be captured using the upper camera in FIG. 5A. One or more detection and/or tracking processes can be used to detect and/or track the user's finger as discussed elsewhere herein. Upon identifying the object, here the user's hand 522, at least one point of interest 524, here the tip of the user's index finger, is determined. As discussed above, the software can use the location of this point with information about the camera to determine a relative direction to the fingertip. A similar approach can be used with the image 540 captured by the lower camera as illustrated in FIG. 5C, where the hand 542 is located and a direction to the corresponding point 544 determined. As illustrated in FIGS. 5B and 5C, there can be offsets in the relative positions of the features due at least in part to the separation of the cameras. Further, there can be offsets due to the physical locations in three dimensions of the features of interest. By looking for the intersection of the direction vectors to determine the position of the fingertip in three dimensions, a corresponding input can be determined within a determined level of accuracy. If higher accuracy is needed, higher resolution and/or additional elements can be used in various embodiments. Further, any other stereoscopic or similar approach for determining relative positions in three dimensions can be used as well within the scope of the various embodiments.

Figure 6:
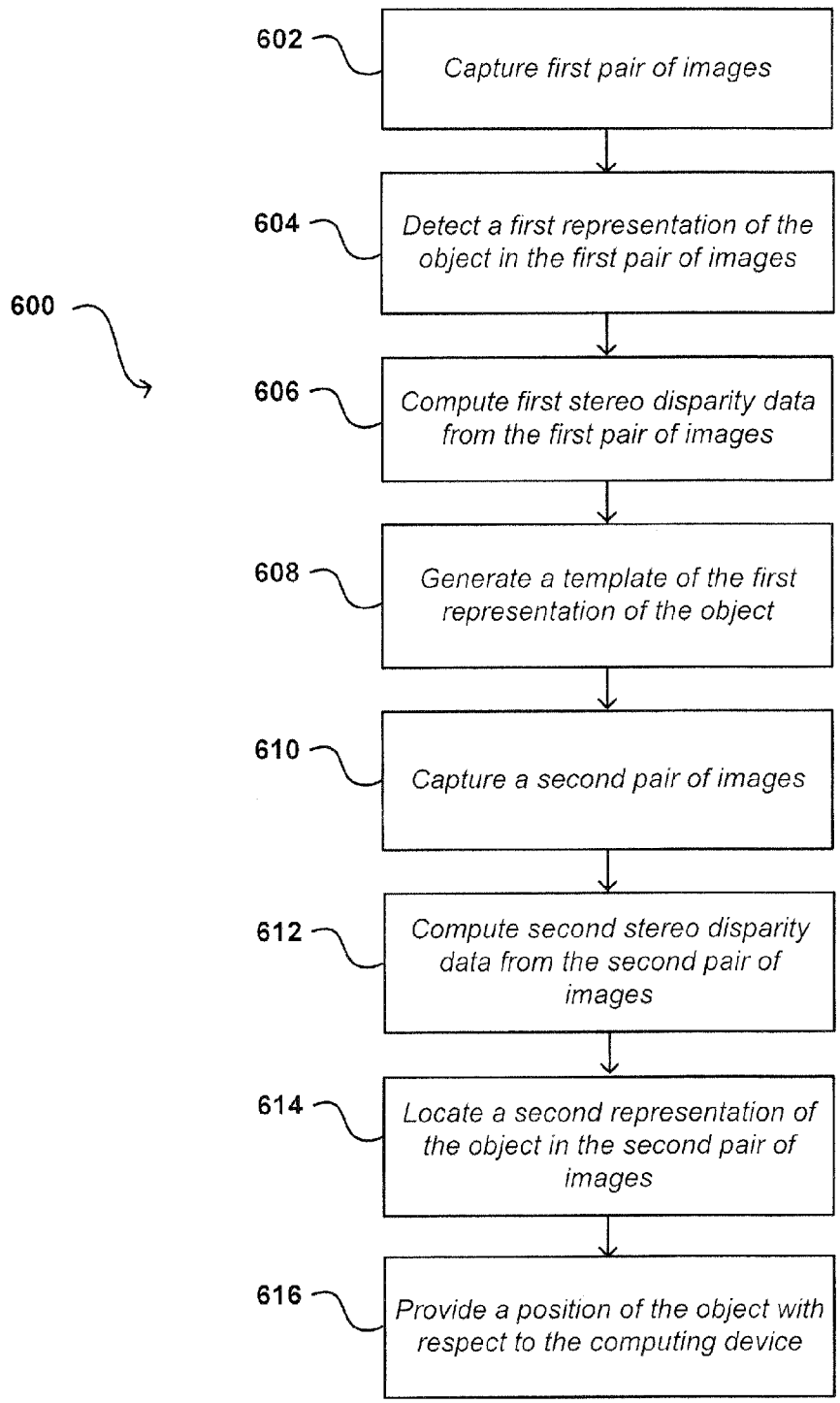
FIG. 6 illustrates an example process for tracking an object in accordance with an embodiment.

FIG. 6 illustrates an example process 600 for tracking an object in accordance with an embodiment. It should be understood that, for any process discussed herein, there can be additional, fewer, or alternative steps performed in similar or alternative orders, or in parallel, within the scope of the various embodiments unless otherwise stated. In this example, the process begins by capturing at least a first pair of images 602 using two or more cameras of a computing device, one image of the first pair captured by one camera and the other image of the first pair captured by a second camera at the same or substantially at the same time. In various embodiments, image data can be pre-processed to improve object detection and tracking. Pre-processing can include histogram equalization or optimization, brightness and contrast optimization, color-cast correction, reduction or removal of noise (e.g., dark-current shot noise, photon shot noise, fixed pattern noise, bias noise, and quantization noise), reduction or removal of specular reflection, and other image optimization or enhancement techniques known to those of ordinary skill in the art. A first representation of an object of interest, is then detected in at least one of the first pair of images. In some embodiments, the object of interest may be automatically detected based on how the user is interacting with the device. For example, if the user is viewing a display screen of a device that is capable of rendering 3-D graphical elements on the display screen based on the perspective of the user with respect to the device (e.g., head pose estimation, gaze estimation), the user's head, face, or eyes can automatically be detected using an object detection process as discussed elsewhere herein. As another example, the user may be playing a rhythm and dancing video game that tracks the user's dance steps such that the user's body (e.g., head, arms, legs, torso) may be automatically detected. In other embodiments, an object of interest may be manually selected by the user, such as via a touchscreen displaying an image. After the object of interest is detected in at least one of the first pair of images, a first stereo disparity map or image corresponding to the object of interest is determined from the first pair of images 606. Then a template can be generated from the first representation of the object and the stereo disparity map or image corresponding to that first representation 608. For example, if the template comprises a primitive geometric encompassing the object of interest, each pixel of the primitive geometric can be associated with depth or disparity information derived from the stereo disparity computation. Similarly, if the template comprises a silhouette or contours of the object of interest, each pixel of the silhouette or each pixel within the contours can be associated with the corresponding stereo disparity.

In at least some embodiments, the user can be directed to "train" a face or body template by capturing images of the user's face or body at multiple points of view or perspectives. For example, in one embodiment, the user may be required to capture a left side profile, a left three-quarters profile, a full frontal, a right three-quarters profile, and a right side profile of the user's head or face. Further, the user may be required to perform various facial expressions, display certain emotions, and/or or pronounce training set of words or sounds to capture the full range of possibilities of the user's facial movements. In some embodiments, a template can be stored on the device or to cloud storage and can be retrieved for a later use.

Once a template has been obtained, a second pair of images can be captured 610. A second stereo disparity map or image can be calculated from the second pair of images 612 and the object of interest can be searched for in at least one of the second pair of images using the template and the second stereo disparity data to determine the location of the object in the second pair of images 614. In some embodiments, a confidence level may also be determined corresponding to the tracked location of the object. In at least some embodiments, when the confidence level of the tracked location of the object is below a threshold confidence value, a different tracking algorithm may be applied or a different template can be used for tracking the object. For example, a full-face template can be used to initially to track the user's face. When a confidence level corresponding to tracking the user's face is below a threshold value, a different template, such as a three quarters profile or a side profile template can be used for tracking the user's face. Using such an approach, an object of interest may undergo various transformations with respect to the computing device without failure of the tracking process. A position of the object of interest with respect to the computing device can be determined based upon the location of the representation of the object in the second pair of images 616. This can be accomplished by camera calibration and mapping of pixel coordinates to world coordinates as known to one of ordinary skill in the art.

In some embodiments, object tracking can be used for enhancing accessibility and/or providing a hands-free experience. For example, non-traditional user gestures such as head nods, eye winks, or nose scrunches can be tracked as input to a computing device. As another example, object tracking, such as head or face tracking, can be used to automatically adjust the orientation of the content being displayed on a computing device without manual intervention by the user. For instance, a user may lay the computing device on a flat surface while situated at a first position and then change positions approximately 90°, 180°, or 270° from the first position. The orientation of the content being displayed on the computing device can change without reliance on inertial sensors. In another embodiment, object tracking (e.g., user's eyes, mouth, hands) can also be used to control media playback. For example, a video or other media content may be paused if the user is not detected for an extended period of time or the user may make a finger gesture in the air to fast-forward media content by spinning her finger in a clockwise motion and rewinding content by spinning her finger in a counter-clockwise motion. In some embodiments, object tracking may be used for facial expression recognition, which can be used to determine an emotional state of a user or provide input to a model for rendering visual data of the user, Object tracking can also be used in virtual or augmented reality applications such as virtual shopping. For instance, a user can virtually try on clothing to determine whether to make an online purchase. Object tracking can also be leveraged for privacy or security purposes, such as applications that require a "live" face, eyes, irises, etc., for biometric validation. Object tracking can be used to supplement or enhance various other applications, such as lip reading to supplement speech-to-text conversion. Other approaches and applications can be utilized as well as should be apparent to one of ordinary skill in light of the teachings and suggestions contained herein.

Figure 7:
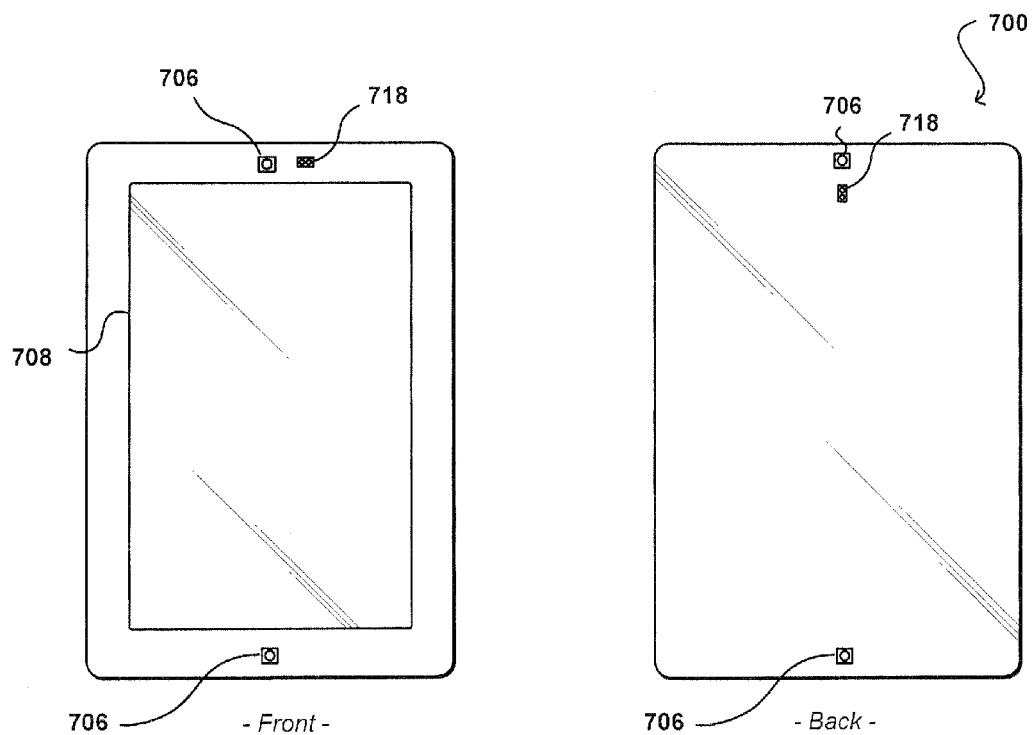
FIG. 7 illustrates an example of a computing device that can be used in accordance with various embodiments.

FIG. 7 illustrates an example computing device 700 that can be used to perform approaches described in accordance with various embodiments. In this example, the device includes two cameras 706 located at the top and bottom on each of a same and opposite side of the device as a display element 708, and enabling the device to capture images in accordance with various embodiments. The computing device also includes a depth imaging system 718 on each side of the device, such as an IR system including one or more IR emitters and one or more IR sensors to determine depth or distance information during image capturing according to certain embodiments.

Figure 8:
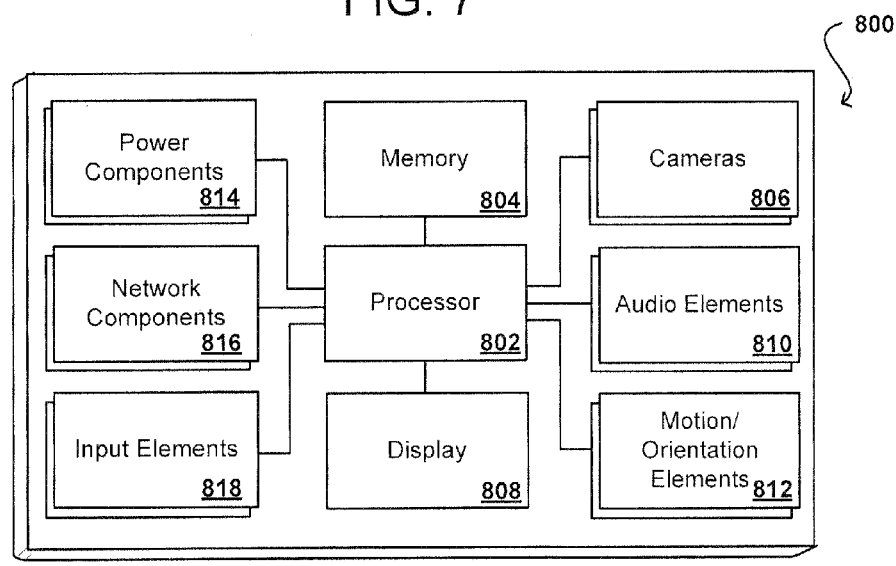
FIG. 8 illustrates an example configuration of components of a computing device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 808, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. As discussed, the device in many embodiments will include one or more cameras or image sensors 806 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 800 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 814 known in the art for providing power to a computing device, which can include capacitive charging elements for use with a power pad or similar device. The computing device can include one or more communication elements or networking sub-systems 816, such as a Wi-Fi, Bluetooth, RF, wired, or wireless communication system. The device in many embodiments can communicate with a network, such as the Internet, and may be able to communicate with other such devices. In some embodiments the device can include at least one additional input device 818 able to receive conventional input from a user. This conventional input can include, for example, a push button, touch pad, touchscreen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include one or more orientation and/or motion sensors 812, Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

In some embodiments, the device 800 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the computing device 800 may include a light-detecting element that is able to determine whether the device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device 800 can disable features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car Or on a plane, and that determination can help to decide which features to enable/disable or which actions are taken based upon other inputs. If speech or voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the camera and associated image analysis algorithm(s) may be sensitive enough to distinguish between the motion of the device, motion of a user's head, motion of the user's eyes and other such motions, based on the captured images alone. In other embodiments, such as where it may be desirable for an image process to utilize a fairly simple camera and image analysis approach, it can be desirable to include at least one orientation determining element that is able to determine a current orientation of the device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
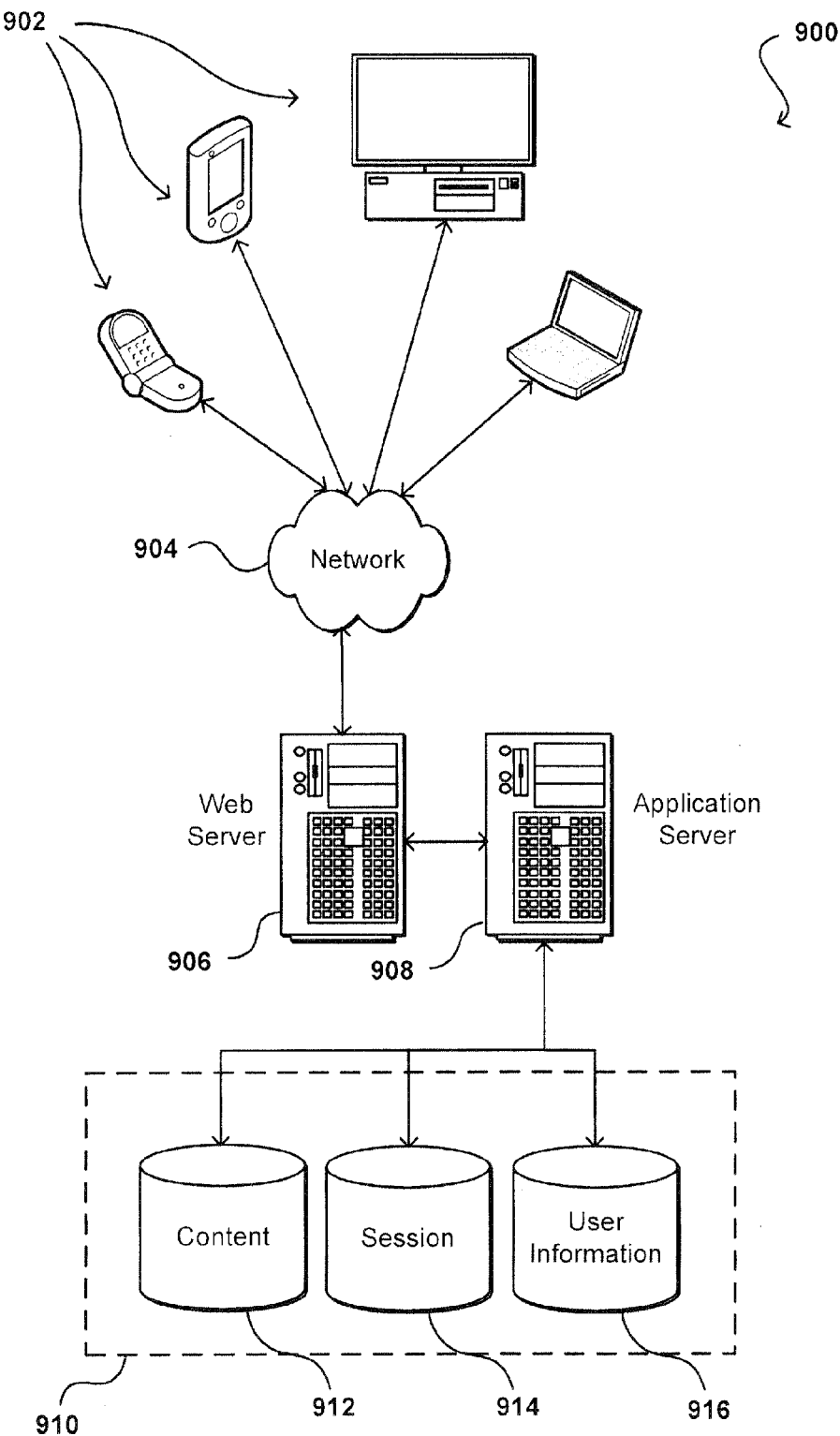
FIG. 9 illustrates an example environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
one or more processors;
one or more cameras; and
memory including instructions that, when executed by the one or more processors, cause the computing device to perform:
capture a first pair of images at a first time using the one or more cameras;
detect a first representation of an object in each of the first pair of images using an object detection process;
compute, from the first pair of images, first stereo disparity data corresponding to the first representation of the object using where the first representation of the object is detected in each of the first pair of images;
generate a first template of a representation of the object using at least one image of the first pair of images and the first stereo disparity data;
capture a second pair of images at a second time using the one or more cameras;
compute second stereo disparity data for the second pair of images;

track a second representation of the object in at least one of the second pair of images using the first template, the second stereo disparity data, and the at least one of the second pair of images;

determine that a first confidence level corresponding to where the second representation of the object is tracked in the at least one of the second pair of images is below a threshold confidence level;

obtain a second template of the representation of the object;

track the second representation of the object using the second template;

determine that a second confidence level corresponding to where the second representation of the object is tracked exceeds the threshold confidence level; and provide a position of the object based at least in part upon where the second representation of the object is tracked in the at least one of the second pair of images.

2. The computing device of claim 1, wherein at least one of the first template or the second template includes at least one of pixel intensities, a histogram, a color histogram, mixture models of pixels, image gradients, edges, surface radiance, depth information, or disparity information.

3. The computing device of claim 1, wherein the instructions when executed to cause the computing device to track the second representation of the object includes causing the computing device to:

compute a similarity measure between at least one of the first template or the second template and each of a plurality of portions of the at least one of the second pair of images; and select at least one of the plurality of portions of the at least one of the second pair of images as the second representation of the object based at least in part upon the similarity measure between the at least one of the first template or the second template and the at least one of the plurality of portions of the at least one of the second pair of images.

4. The computing device of claim 1, further comprising a display screen, wherein the object comprises at least a portion of a face of a user and the instructions when executed further cause the computing device to:

display one or more three-dimensional graphical elements on the display screen according to a perspective based at least in part upon the position of the face of the user with respect to the computing device.

5. A computer-implemented method for tracking an object, comprising:

under control of one or more computer systems configured with executable instructions, obtaining a first template of a first representation of the object, the first template including first disparity information corresponding to the first representation of the object;

obtaining one or more images;

determining second disparity information corresponding to at least one of the one or more images;

tracking the first representation of the object in the at least one of the one or more images based at least in part upon the first template, the second disparity information, and the at least one of the one or more images;

determining that a first confidence level corresponding to where the first representation of the object is tracked in the at least one of the one or more images is below a threshold confidence level;

obtaining a second template of a second representation of the object;

tracking the second representation of the object using the second template;

determining that a second confidence level corresponding to where the second representation of the object is tracked using the second template exceeds the threshold confidence level; and providing a position of the object based at least in part upon where the second representation of the object is tracked in the at least one of the one or more images.

6. The computer-implemented method of claim 5, wherein obtaining the first template of the first representation of the object includes:

obtaining a first pair of images;

detecting the first representation of the object in each of the first pair of images using an object detection process;

computing stereo disparity data corresponding to the first representation of the object based at least in part upon where the first representation of the object is detected in each of the first pair of images; and generating the first template of the first representation of the object using at least one of the first pair of images and the stereo disparity data.

7. The computer-implemented method of claim 6, wherein computing the stereo disparity data corresponding to the first representation of the object includes:

computing a matching cost for each of a first plurality of portions of a first image of the first pair of images and a second plurality of portions of a second image of the first pair of images;

aggregating the matching cost for each of the first plurality of portions and the second plurality of portions over a plurality of support regions; and selecting a disparity value for each pixel of at least one of the first image or the second image based at least in part upon the matching cost for a support region in which the pixel resides.

8. The computer-implemented method of claim 7, further comprising:

calculating sub-pixel disparity for each of a plurality of pixels of the at least one of the first image or the second image.

9. The computer-implemented method of claim 5, wherein at least one of the first template or the second template includes at least one of pixel intensities, a histogram, a color histogram, mixture models of pixels, image gradients, edges, surface radiance, depth information, or disparity information.

10. The computer-implemented method of claim 5, wherein the second disparity information includes a disparity value for each pixel of a first plurality of pixels of a first image of the one or more images with respect to a corresponding pixel of a second plurality of pixels of a second image of the one or more images.

11. The computer-implemented method of claim 5, wherein tracking the first representation of the object includes:

computing a respective similarity measure between the first template and each of a plurality of portions of the at least one of the one or more images; and selecting at least one of the plurality of portions of the at least one of the one or more images as the second representation of the object based at least in part upon the respective similarity measure between the first template and the at least one of the plurality of portions of the at least one of the one or more images.

12. The computer-implemented method of claim 5, wherein the object comprises at least a portion of a face of a user, the method further comprising:

displaying one or more three-dimensional graphical elements on a display screen according to a perspective based at least in part upon the position of the face of the user with respect to the computing device.

13. A non-transitory computer-readable storage medium storing instructions for tracking an object, the instructions when executed by one or more processors causing a computing device to:
obtain a first template of a first representation of the object, the template including first disparity information corresponding to the first representation of the object;
obtain one or more images;
determine second disparity information corresponding to at least one of the one or more images;
track the first representation of the object in the at least one of the one or more images based at least in part upon the first template, the second disparity information, and the at least one of the one or more images;
determine that a first confidence level corresponding to where the first representation of the object is tracked in the at least one of the one or more images is below a threshold confidence level;
obtain a second template of a second representation of the object;
track the second representation of the object using the second template;
determine that a second confidence level corresponding to where the second representation of the object is tracked using the second template exceeds the threshold confidence level; and
provide a position of the object based at least in part upon where the second representation of the object is tracked in the at least one of the one or more images.

14. The non-transitory computer-readable storage medium of claim 13, wherein the instructions when executed to cause the computing device to obtain the first template of the first representation of the object include causing the computing device to:
obtain a first pair of images;
detect the first representation of the object in each of the first pair of images using an object detection process;
compute stereo disparity data corresponding to the first representation of the object based at least in part upon where the first representation of the object is detected in each of the first pair of images; and
generate the first template of the first representation of the object using at least one of the first pair of images and the stereo disparity data.

15. The non-transitory computer-readable storage medium of claim 14, wherein the instructions when executed to cause the computing device to compute the stereo disparity data corresponding to the first representation of the object include causing the computing device to:

compute a matching cost for each of a first plurality of portions of a first image of the first pair of images and a second plurality of portions of a second image of the first pair of images;
aggregate the matching cost for each of the first plurality of portions and the second plurality of portions over a plurality of support regions; and
select a disparity value for each pixel of at least one of the first image or the second image based at least in part upon the matching cost for a support region in which the pixel resides.

16. The non-transitory computer-readable storage medium of claim 13, wherein the object comprises at least a portion of a face of a user, and the instructions when executed further cause the computing device to:
display one or more three-dimensional graphical elements on a display screen according to a perspective based at least in part upon the position of the face of the user with respect to the computing device.

17. The non-transitory computer-readable storage medium of claim 13, wherein the instructions when executed to cause the computing device to track the first representation of the object includes causing the computing device to:
compute a respective similarity measure between the first template and each of a plurality of portions of the at least one of the one or more images; and
select at least one of the plurality of portions of the at least one of the one or more images as the second representation of the object based at least in part upon the respective similarity measure between the first template and the at least one of the plurality of portions of the at least one of the one or more images.

18. The non-transitory computer-readable storage medium of claim 13, wherein the object comprises at least a portion of a face of a user, and the instructions when executed further cause the computing device to:
display one or more three-dimensional graphical elements on a display screen according to a perspective based at least in part upon the position of the face of the user with respect to the computing device.

19. The non-transitory computer-readable storage medium of claim 15, wherein the instructions when executed further cause the computing device to:
calculate sub-pixel disparity for each of a plurality of pixels of the at least one of the first image or the second image.

20. The non-transitory computer-readable storage medium of claim 13, wherein the second disparity information includes a disparity value for each pixel of a first plurality of pixels of a first image of the one or more images with respect to a corresponding pixel of a second plurality of pixels of a second image of the one or more images.

* * * * *